Figure 1:
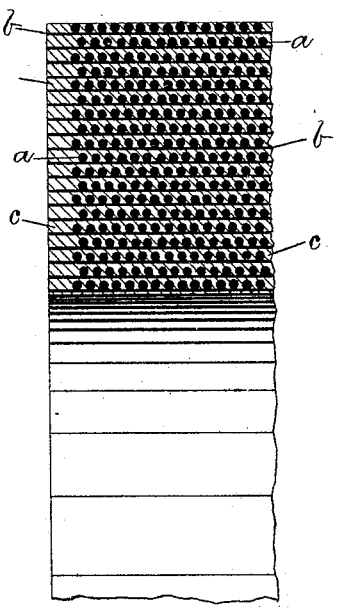

(No Model.)

H. C. BUCK.
COIL FOR ELECTRICAL APPARATUS.

No. 486,926.  Patented Nov. 29, 1892.

Witnesses.
J. E. Maynadier
John R. Snow.

Inventor.
H. C. Buck

United States Patent Office.

HENRY C. BUCK, OF SOMERVILLE, MASSACHUSETTS.

COIL FOR ELECTRICAL APPARATUS.

SPECIFICATION forming part of Letters Patent No. 486,926, dated November 29, 1892.

Application filed December 5, 1884. Serial No. 149,559. (No model.)

*To all whom it may concern:*

Be it known that I, HENRY C. BUCK, a citizen of the United States, residing at Somerville, in the county of Middlesex and State of Massachusetts, have invented the Improved Coil for Electric Apparatus, of which the following is a specification.

My invention relates to coils of wire for use as induction-coils or to surround rods of iron to form electro-magnets or other like uses. Heretofore such coils have been made in general of insulated wire closely wound—that is, so that the insulating-covering of each convolution would be in contact with the covering of the neighboring convolutions.

My invention consists in a coil composed of a series of convolutions, each convolution being surrounded by a coating of paraffine or other plastic insulator.

The chief merit of my invention is that I am enabled to dispense with the insulated covering on the wire now generally employed, for the plastic insulating material is got in between the convolutions as the wire is wound, and in the finished coil each convolution will be completely and very perfectly surrounded by the coating.

Another merit is that my coils are not affected by moisture, for there are practically no pores, so that moisture is effectually excluded from the convolutions. Each convolution is also securely held in its place with respect to all the others.

In practice I make my coils when of fine wire, say No. 36, as follows: I take a spool with one or both heads detachable, whose barrel is of a diameter suitable for the internal diameter of the proposed coil, and put this spool into a suitable lathe, so that it can be revolved precisely as if I were going to make an ordinary coil. Then I cover the barrel of the spool with a sheet of paper coated with paraffine and proceed to wind the first spiral, keeping the paraffine sufficiently warm by a gas-jet, which is preferably attached to the carriage or feed-slide of the lathe, so as to warm only that part of the paraffine near the convolution about to be embedded in it. In this and all other spirals the naked wire of each convolution is separated from the wire in its neighboring convolutions by the insulating material. After the first spiral or layer of convolutions is thus wound I cover it with a second sheet of the paraffine-paper and proceed as before, only, of course, winding in the opposite direction. All the other spirals are wound as above described, there being a cylinder formed of a sheet of paraffine-paper between each spiral and its neighbors. The spool is then removed, and when paraffine is used for the insulating-coating this is readily done by making the spool of metal and heating it sufficiently to soften the paraffine. When the coil is for use as an induction-coil, I then insert the primary coil and its core and in most cases put the whole into a suitable box and fill the box with melted paraffine, leading the ends of both coils through the ends of the box, thereby making a complete induction-coil, which is far cheaper and also more compact and effective than any other known to me.

Figure 2:
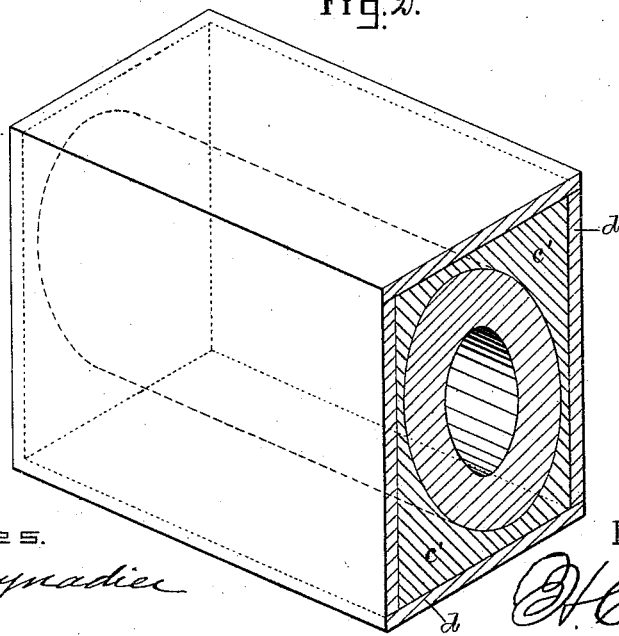

In the drawings, Figure 1 is an enlarged sectional view for illustration, *a* being the wire, *b* the paper, and the hatched portion *c* representing the insulating-coating of paraffine. Fig. 2 is a perspective view, partly in section, of one of my coils complete, *d* representing the walls of the box, and *c'* the paraffine surrounding the coil.

This second feature of my invention—to wit, enveloping the coil in paraffine or the like—is applicable whether the coil embody the main feature of my invention or be otherwise constructed.

I do not limit my invention to insulating-cylinders of paraffine-paper, as it will be clear that a coating of wax, gum, or suitable insulating compounds may be used, and in some cases, as when the coil is to be exposed to heat, paraffine will not answer. For example, in making coils for certain uses the insulating-cylinders are best made of thin sheets of soft rubber instead of paraffine-paper, and when the wire is of large diameter sheets of thin duck coated on both sides with soft rubber will answer well.

In all large induction-coils it is of course well to use a hard-rubber tube between the primary and secondary in the usual way.

In case of a break in the wire, as often happens in winding coils of the smaller sizes of wire, I lay the pieced portion of the convolution considerably farther from the convolution next preceding it and lay the convolution next succeeding it considerably farther from the pieced portion of the convolution than the distance between any two unpieced convolutions.

Both features of my invention are obviously applicable in making resistance-coils; but in such coils two wires are wound on at once, as usual.

In order to insure the absence of cavities, the coil after it is wound should be kept heated in paraffine for several hours. This treatment serves to surround the convolutions more completely with the paraffine, even when cylinders of paraffine-paper are used in winding the coil, and when a coil is wound in the ordinary way, the coil being insulated by a fibrous covering, this treatment will leave each coil embedded in paraffine, an ordinary coil thus treated being the same in substance electrically as a coil of fine wire made in the specific manner above described, but being of course more expensive. This boiling in paraffine is not of course essential when the coil is formed by winding on cylinders of paraffine-paper.

I am aware of Manley's patent, No. 247,082, dated September 13, 1881, and Brooks' patent, No. 210,987, dated December 17, 1878, and disclaim all that is shown in them.

I am aware of the description and illustration of induction-coils given in the *Scientific American*, supplement for January 25, 1879, Vol. VII, pages 2547-8, and disclaim what is therein set forth.

What I claim as my invention is—

The improved coil above described, made up of a series of spiral coils, each spiral separated from the spirals under and over it by a cylinder of thin insulating sheet material coated with a plastic insulating material and each convolution of each spiral separated from its neighbors by the plastic insulating-coating of the insulating-sheet material, all substantially as and for the purpose set forth.

H. C. BUCK.

Witnesses:
J. E. MAYNADIER,
JOHN R. SNOW.